United States Patent [19]

Harazoe et al.

[11] 4,119,943
[45] Oct. 10, 1978

[54] MONITOR SYSTEM FOR CONSTRUCTION VEHICLES

[75] Inventors: Yoshiaki Harazoe; Shigeru Kurakami, both of Hirakata, Japan

[73] Assignee: Kabushiki Kaisha Komatsu Seisakusho, Tokyo, Japan

[21] Appl. No.: 759,611

[22] Filed: Jan. 14, 1977

[51] Int. Cl.² .............. G08B 21/00; H04Q 1/45
[52] U.S. Cl. .................. 340/52 F; 325/47; 325/117; 340/524; 340/539
[58] Field of Search ........... 340/52 F, 224, 409, 340/412, 171 PF; 325/47, 51, 53, 61, 117

[56] References Cited

U.S. PATENT DOCUMENTS

| 3,641,539 | 2/1972 | Lesher | 340/213.1 |
|---|---|---|---|
| 3,689,888 | 9/1972 | Wootton | 340/164 R |
| 3,720,911 | 3/1973 | Bomar, Jr. | 340/52 F |
| 3,757,315 | 9/1973 | Birchfield et al. | 340/224 |
| 3,792,455 | 2/1974 | Phillips | 340/224 |
| 3,806,921 | 4/1974 | Pappas | 340/412 |
| 4,058,802 | 11/1977 | Meyers | 340/224 |

Primary Examiner—John W. Caldwell, Sr.
Assistant Examiner—Joseph E. Nowicki
Attorney, Agent, or Firm—Sughrue, Rothwell, Mion, Zinn and Macpeak

[57] ABSTRACT

A monitor system for construction vehicles comprises a plurality of sensors provided on each of the vehicles and each being for a different one of check points of the vehicle. A sensor provided on each of the vehicles transmits a one-channel signal indicating an abnormal condition occurred at at least one of the sensors and a monitor station responsive to the signal transmitted from at least one of the vehicles identifies the abnormal condition and the vehicles on which the latter occurs.

2 Claims, 7 Drawing Figures

MONITOR SYSTEM FOR CONSTRUCTION VEHICLES

FIELD OF THE INVENTION

The present invention relates to a remote monitor system for construction vehicles (hereinafter referred to merely as "vehicles" when applicable).

DESCRIPTION OF THE PRIOR ART

So far as the inventors know, there is no prior art concerning the remote monitor system for construction vehicles by which the vehicles are collectively controlled or monitored. In the past, construction vehicles may be inspected or checked for security by a person responsible for control of them (hereinafter referred to as "a controller" when applicable) before they are dispatched to their destinations, or construction fields. However, if abnormal conditions or troubles occur in the vehicle being operated at the field, he cannot deal with the troubles, that is, he must leave it to the operator to deal with the troubles. Thus, in fact it has been impossible to establish control of the vehicles operating at the fields. As a result, such abnormal conditions frequently develop into personal injuries or economical and physical damages. Therefore, a provision of the remote monitor system is highly desired.

In order to make remote monitoring of the check points of each of a plurality of construction vehicles possible, it may be necessary to use a number of different frequencies, the number corresponding to at least the number of the vehicles to be monitored. Each vehicle has a number of check points, such as water level in a radiator, cooling water temperature, vehicle speed, engine revolution, oil pressure, clogging of air cleaner, etc. Therefore, it is also desired to reduce the number of frequencies as much as possible because if different frequency signals are assigned to the respective check points of the vehicles to identify particular points of particular vehicles, the number of frequencies necessary would become too large to obtain a reasonable number of transmission channels.

Further, even if such large number of frequencies is usable, it may cause the manufacture and maintenance of such remote monitor system to be troublesome.

SUMMARY OF THE INVENTION

An object of the present invention is to provide a remote monitor system for construction vehicles.

Another object of the present invention is to make the above object possible by using a minimum number of frequencies.

Another object of the present invention is to provide a remote monitor system in which abnormal check points are identified respectively.

Another object of the present invention is to provide an alarming signal to operators of the vehicles in which abnormal conditions occur.

A further object of the present invention is to forcibly terminate the operation of the vehicles when appropriate actions are not taken to the vehicles on which abnormalities are detected.

These objects are achieved by using a two-frequency mixing, frequency modulation system. For example, in the case where each vehicle has eight kinds of check points and three vehicles are to be monitored, a total number of 24 kinds of signals are required to identify the respective check points. If frequencies are assigned to the check points, respectively, 24 frequencies are required as mentioned before. However, the number of channels for such purpose is limited and the constructions of the vehicle should be standardized for economical purpose. According to the present invention, the same sets of audio frequency signal oscillators are used for the vehicles respectively and by combining two of the frequency signals in suitable combination, a different set of signals is produced, the number of such different signals being large enough to cover all kinds of the sensors on the vehicles. That is, in the case where, for example, three vehicles each having eight check points are to be monitored, $3 \times 8 \leq xC_2$ where $x$ is an integer corresponding to the required number of frequencies. Therefore, in this case a set of only eight frequency oscillators are required to cover 24 sensors.

Further in order to minimize the number of transmission channels, a frequency modulation system is employed in the present invention. That is, the audio frequency signals frequency-modulate a common carrier wave. By this arrangement, only a single channel is required.

DESCRIPTION OF THE EMBODIMENT

In an embodiment in FIG. 1, for example, three construction vehicles A, B and C are to be remote monitored. The transmitting or sensor devices mounted on the vehicles have substantially the same constitutions. Therefore, it may be enough to describe only that mounted on the vehicle A.

Each of the vehicles is assumed to have eight kinds of sensors, i.e., an engine rotation sensor $a$, an engine water temperature sensor $b$, an air cleaner clogging sensor $c$, a radiator water level sensor $d$, an oil pan oil quantity sensor $e$, an engine oil filter clogging sensor $f$, an engine oil pressure sensor $g$, and a torque converter oil temperature sensor $h$.

Figure 1A:
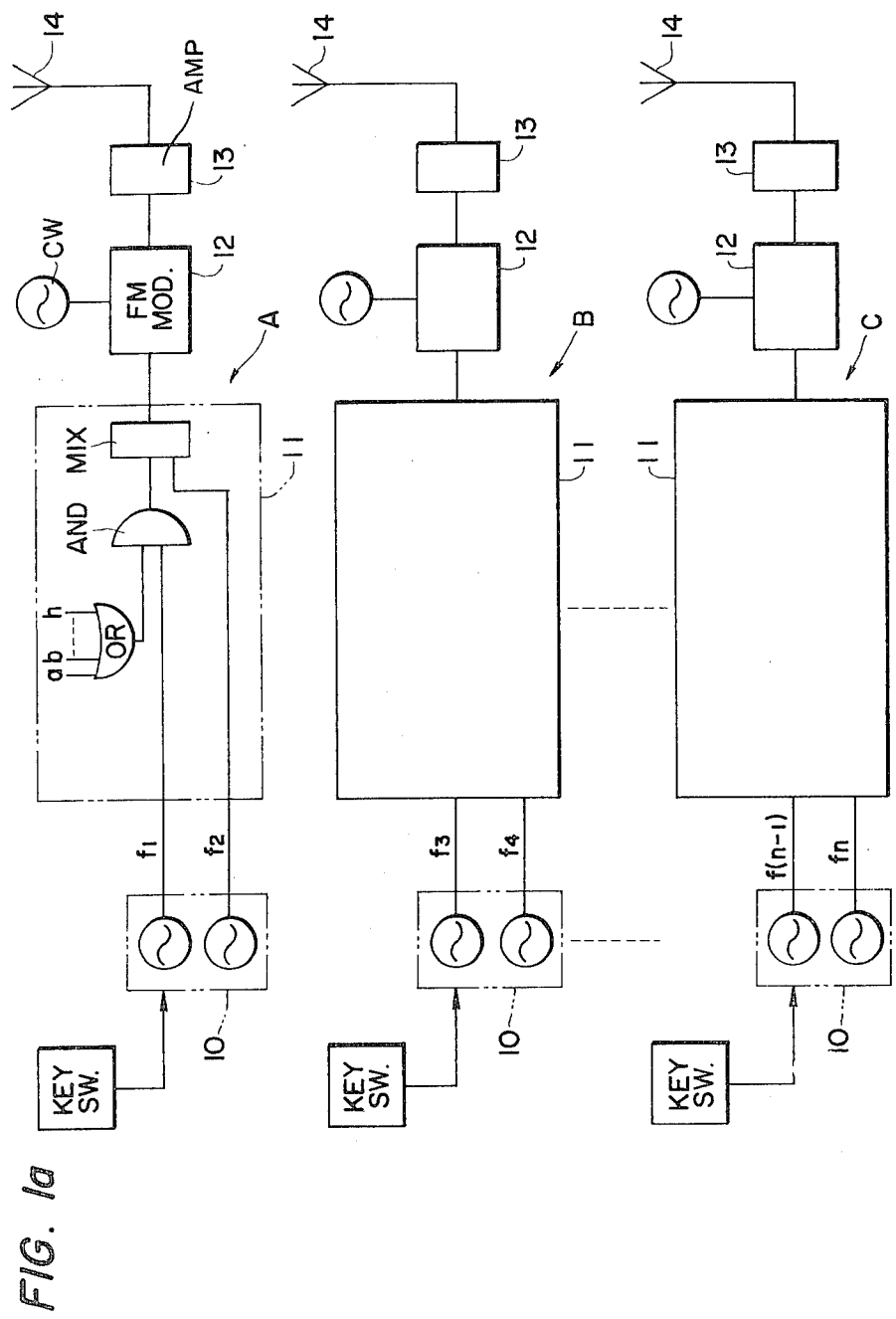
FIGS. 1a and 1b show an embodiment of the present invention.

In FIG. 1a which shows a transmitting device, it comprises a pair of audio signal oscillators 10 generating a pair of frequencies $f_1$ and $f_2$ and being actuated by a engine key switch of the vehicle A, an OR gate having inputs to which outputs of the sensors $a$ to $h$ which may be normally open on-off switches are supplied.

The output of the OR gate is connected to one input of an AND gate the other input of which is supplied with the frequency $f_1$. The output of the AND gate is supplied to a frequrency mixer.

The frequency $f_2$ is directly supplied to the mixer.

In operation, the oscillation generates the frequencies $f_1$ and $f_2$ upon the turning-on of the key switch. When there is no abnormality detected, only the frequency $f_2$ can go through the mixer to a frequency modulator 12 to frequency modulate a carrier wave. The modulated signal is amplified and transmitted.

When any of the sensors detects abnormality, the OR gate provides an output to open the AND gate to thereby pass the frequency $f_1$ to the mixer.

The mixer provides a signal composed of the frequencies $f_1$ and $f_2$ and the carrier wave is frequency modulated with the signal and the modulated signal is transmitted after amplification.

Figure 1B:
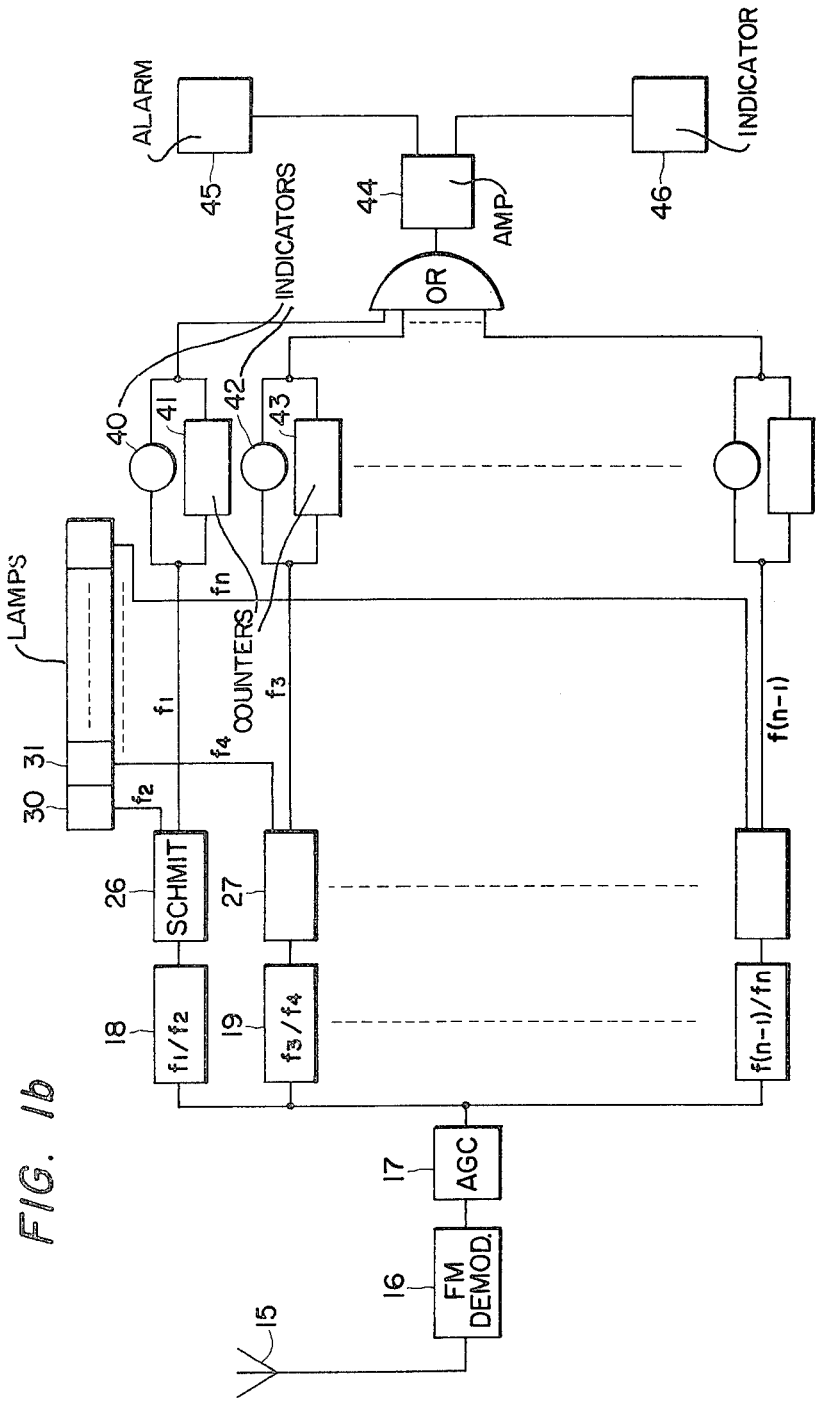

The transmitted waves are received by a non-directional antenna 15 provided in a monitor station shown in FIG. 1b. With only the frequency $f_2$, it is recorded by a demodulator 16 and the amplitude thereof is regulated by an AGC circuit 17. The output of the AGC 17 is connected to a plurality of filters 18, 19 . . . etc., the number corresponding to that of the vehicles to be monitored. Each of the filters functions to pass only the frequencies to be generated by a particular vehicle. For the vehicle A, the signal can pass only the filter 18. The output of the filter 18 is transformed to a suitable form to be digitally processed by a Schmidt circuit 26, and the $f_2$ component is fed to a key switch confirmation lamp to indicate the vehicle in operation.

With the signal containing the mixed two frequencies $f_1$ and $f_2$, the $f_1$ component is fed to an indicator 40 and a counter 41 to indicate the abnormality occurred in the vehicle A and to count the number of occurrence thereof, respectively.

The $f_1$ component is added to one of inputs of an OR gate. Therefore, the latter gate provides an output when there is an abnormal condition in any of the vehicles. The output of the OR gate is amplified by an amplifier 44 and used to indicate the existence of the abnormality by application to an alarm device 45 and, if necessary, to an indicator 46.

Figure 2:
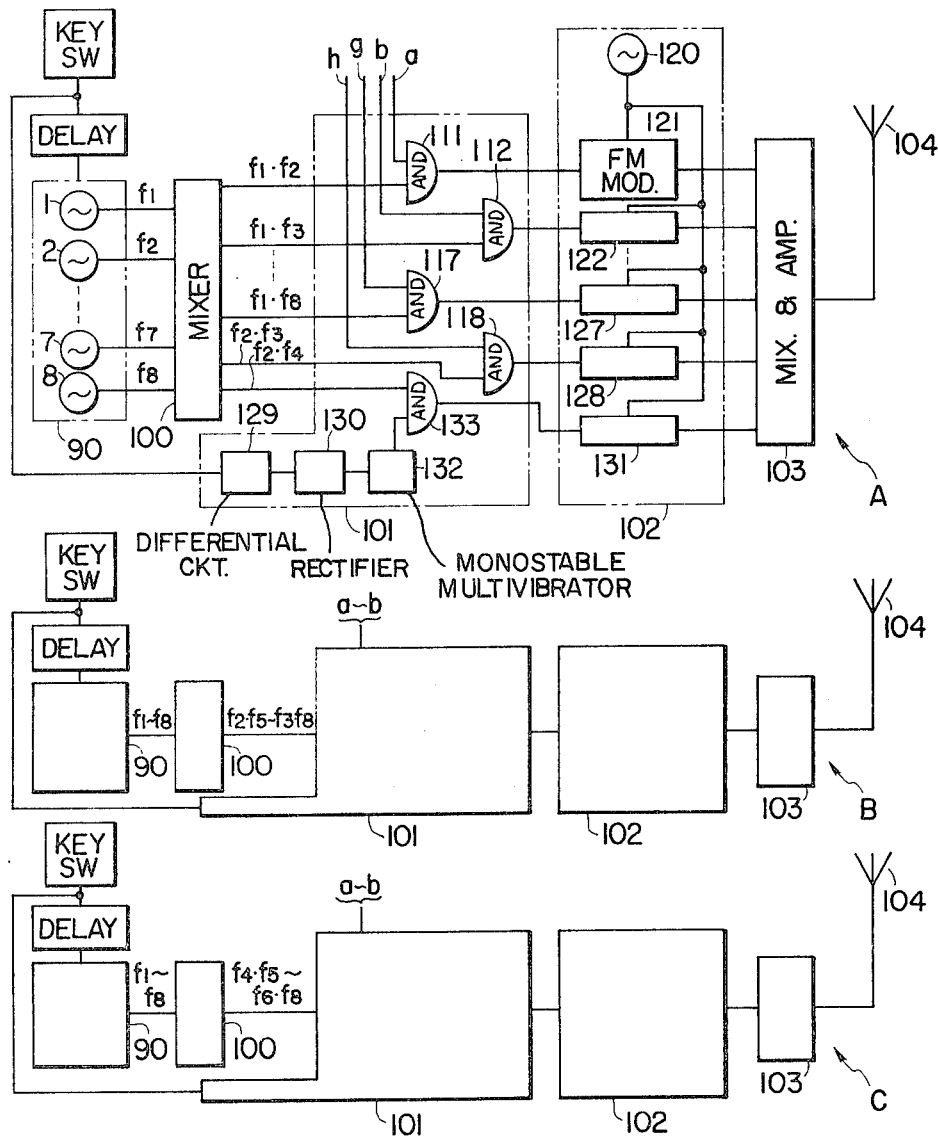
FIG. 2 is a partial block circuit diagram of an embodiment of the present remote monitor system, showing sensor arrangements to be mounted on construction vehicles.

FIG. 2 shows another embodiment of the present invention. In FIG. 2, the transmitting device of the vehicle A comprises an oscillating device 90 containing eight oscillators 1 to 8, which, in response to an actuation of a engine key switch, produce signals having frequencies $f_1$ to $f_8$, respectively. Signals $f_1$ to $f_8$ are added to a mixer 100. The mixer 100 mixes two of the signals $f_1$ to $f_8$ in an appropriate combination to provide, for example, signals $(f_1 + f_2)$, $(f_1 + f_3)$ . . . $(f_1 + f_8)$, $(f_2 + f_3)$, and $(f_2 + f_4)$.

The sensor devices of the vehicles B and C are exactly the same as that of the vehicle A except that the respective mixers 100 produce different two frequency combinations of the eight frequencies $f_1$-$f_8$.

Each of the outputs of the mixer 100 is supplied to a sensor circuit 101 comprising AND gates 111 to 118 and 133, a differential circuit 129 for differentiating the output of the key switch, a rectifying circuit 130 for rectifying the output of the differential circuit 129 and a monostable multivibrator 132 for providing a pair of pulses in response to the output of the rectifying circuit 130. The outputs of the mixer 100 are added to one inputs of the AND gates 111 to 118 and 133. To the other input of the AND gates 111 to 118, the outputs of the sensors a to h of the vehicle A, which may be normally open on-off switches, are added, respectively. Also, to the other input of the AND gate 133 the output of the monostable multivibrator 132 is supplied. Each of the sensors a to h may be closed when an abnormal condition occurrs at a corresponding check point to provide an output to be supplied to the one input of a corresponding AND gate.

The outputs of the AND gates 111 to 118 and 133 are connected to the FM modulating device 102, which comprises a carrier generator 120 and FM modulators 121 to 128, and 131. The carrier generator 120 provide a carrier wave to the modulators 121 to 128 and 131. The outputs of AND gates 111 to 118 and 132 are connected to the modulators 121 to 128 and 131, respectively.

The output of the modulator 102 is provided to the output circuit 103 comprising a mixer and an amplifier, and a one-channel signal is transmitted by a non-directional antenna 14.

In operation, when the key switch is turned on, the oscillators 1 to 8 are actuated with a certain small delay and provide frequency signals $f_1$ to $f_8$, respectively. The signals are supplied to the mixer 10 and the latter provides a group of mixed signals $(f_1 \cdot f_2)$, $(f_1 \cdot f_3)$ . . . $(f_1 \cdot f_8)$, $(f_2 \cdot f_3)$ and $(f_2 \cdot f_4)$. As to the vehicles B and C the mixed signals may be $(f_2 \cdot f_5)$ to $(f_3 \cdot f_8)$ and $(f_4 \cdot f_5)$ to $(f_6 \cdot f_8)$, respectively.

The signals $(f_1 \cdot f_2)$, $(f_1 \cdot f_3)$ . . . $(f_1 \cdot f_8)$, $(f_2 \cdot f_3)$, $(f_2 \cdot f_4)$ are added to the one inputs of the AND gates 111 to 118 and 133, respectively, as mentioned before.

Assuming that, at this time, there are no abnormal conditions existing, these signals cannot pass the respective gates.

On the other hand, the turning-on of the key switch suuplies an abruptly rising signal to the differential circuit 129 directly which provides a sharp pulse in a certain direction. The pulse passes through the rectifier 130 to the monostable multivibrator 132. The monostable multivibrator 132 provides a pulse having a certain width, which is supplied to the other input of the AND gate 133. Since the AND gate 133 becomes open in response to the pulse from the monostable multivibrator 132, the signal $(f_2 \cdot f_4)$ is permitted to pass therethrough to the FM modulator 131 in which the carrier wave from the carrier generator 120 is frequency-modulated with the signal $(f_2 \cdot f_4)$. The modulated signal is amplified by the output circuit 103 and transmitted by the antenna 104. It should be noted that a time for which the signal $(f_2 \cdot f_4)$ is transmitted is determined by the time constant of the monostable multivibrator 132. It should be also noted that the signal $(f_2 \cdot f_4)$ is also transmitted at a time when the key switch is turned off. The function of the signal $(f_2 \cdot f_4)$ will be described later.

Then, if only the sensor a detects an abnormality and turns on thereby, it provides an output to the other input of AND gate 111. Therefore, the signal $(f_1 \cdot f_2)$ corresponding the sensor a is permitted to pass to the FM modulator 121 and the carrier frequency-modulated with the signal $(f_1 \cdot f_2)$ is transmitted by the antenna 104.

The above mentioned operation of the sensor device is the same as those of the devices mounted on the vehicles B and C.

Figure 3:
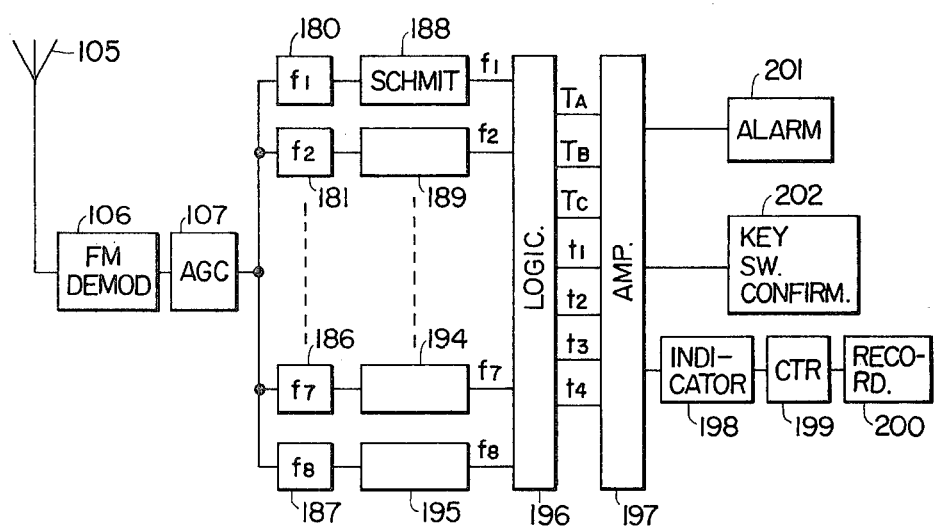
FIG. 3 is a block circuit diagram of a monitor station.

The modulated signal transmitted in this manner is received by a remote monitoring station which is shown in FIG. 3.

In FIG. 3, the monitor station comprises a non-directional antenna 105, a demodulating circuit 106, an AGC circuit 107, to regulate the amplitude of demodulated signals from the circuit 106, filter circuits 180 to 187 connected in parallel with each other and having inputs connected to the output of the AGC circuit 107, Schmidt trigger circuit 188 to 195 connected, respectively, with the filter circuits 180 to 187, a logic circuit 196, an amplifying circuit 197 connected to the logic circuit, an alarm device 201 for providing an alarm when any abnormality is signalled, an abnormality indication device 198, a counter device 199 indicating the number of abnormalities occurred at the specific points, a recording device 200 to record the occurrence of abnormality, and a device 202 to confirm key switches of the vehicles in operation.

The signal received by the antenna 105 is frequency demodulated by the demodulator 106 and the output thereof is regulated by the AGC circuit 107.

The demodulated signal is supplied to the filters 180 to 187 which are bandpass filters having characteristic frequencies $f_1$ to $f_8$, respectively. The output of the filters are normalized by the Schmit circuits 188 to 195, respectively, to produce signals suitable to be processed in binary logic. The outputs of the Schmit circuits are connected to the logic circuit 196.

Figure 4:
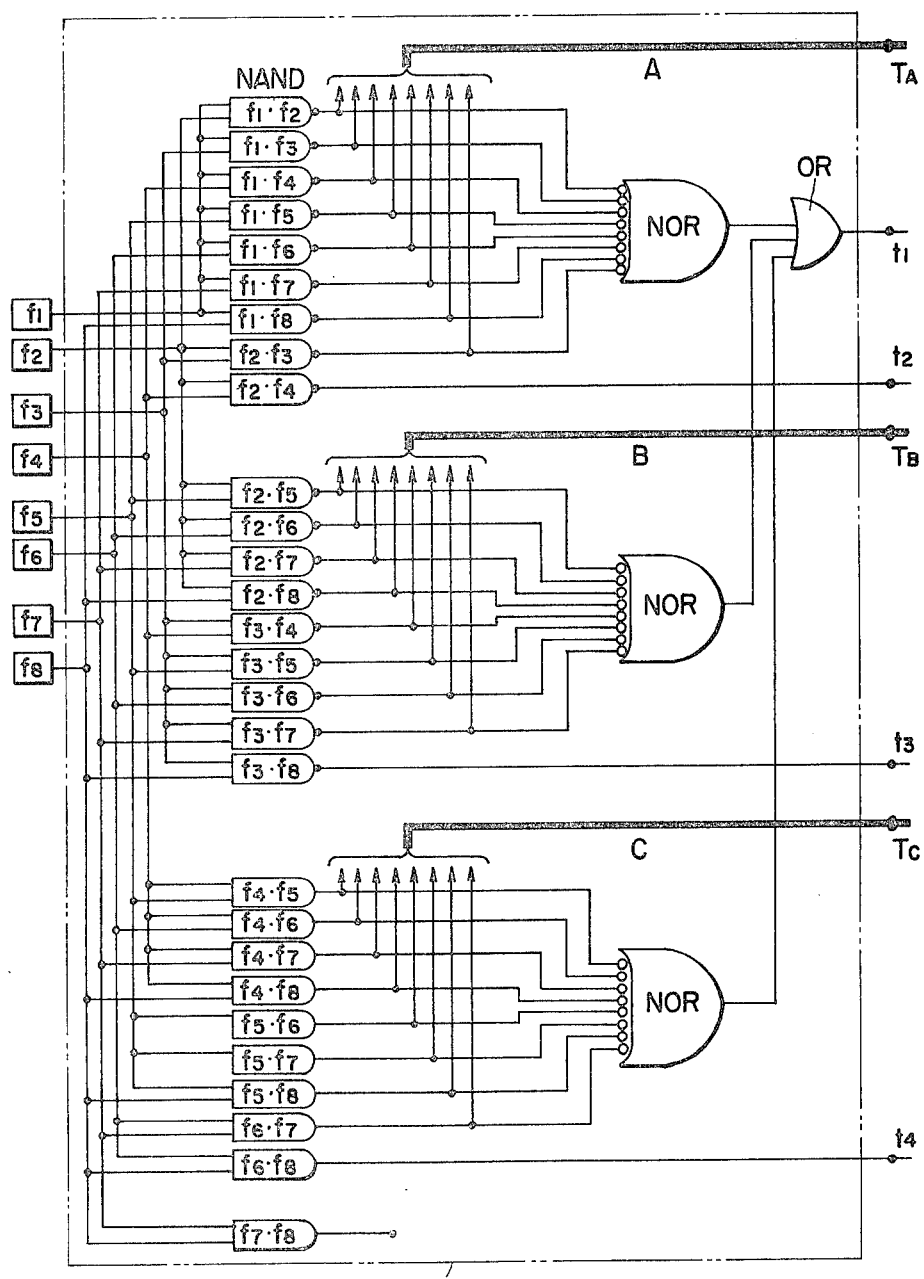
FIG. 4 is a detailed logic circuit of a component of the monitor station.

FIG. 4 shows a detailed circuit diagram of the logic circuit 196.

The logic circuit 196 comprises three groups of elements, each group being assigned to a different vehicle and being constituted with nine NAND gates, a NOR gate and an OR gate. Since the constructions of the three element groups are the same, only one of them assigned to the vehicle A will be described.

At the time when the key switch of the vehicle A is turned on, the signal $(f_2 \cdot f_4)$ is frequency-modulated and transmitted for a certain short period determined by the time constant of the monostable multivibrator 132 of the sensor circuit 101 mounted on the vehicle. The signal is demodulated by the FM demodulator 106 and the amplitude of the demodulated signal is regulated by the AGC 107. The regulated signal, of course, includes only frequencies $f_2$ and $f_4$. Therefore, these frequencies are passed through the filters 181 and 182, respectively, and supplied to terminals shown by $f_2$ and $f_4$ in FIG. 4.

Therefore, the NAND gate designated by $f_2 \cdot f_4$ provides an output which appears at a terminal $t_2$.

Figure 5:
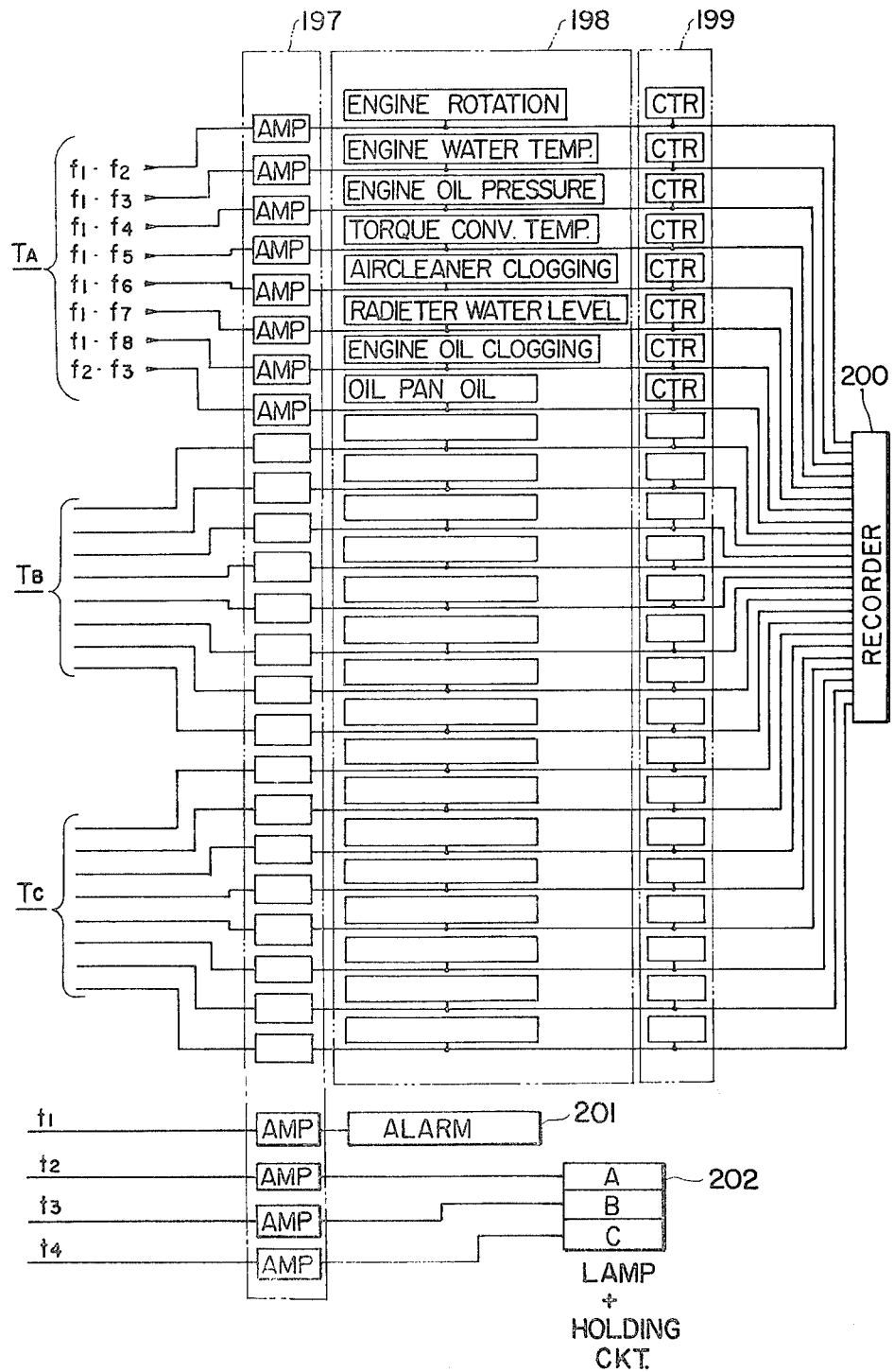
FIG. 5 is a detailed circuit of another component of the monitor station.

Referring to FIG. 5 which shown the amplifying device 197, the abnormality indication device 198, the counter 199, the recorder 200, the alarm device 201 and the key switch confirmation device 202, the signal at the terminal $t_2$ is amplified and supplied to a section A of the confirmation device 202 which further includes sections B and C for the vehicles B and C.

Each of the sections A, B and C may comprise a lamp and a holding circuit. The holding circuit may include a bistable multivibrator or the like. Upon a receipt of the signal from the terminal $t_2$, the holding circuit of the section A turns on to light the lamp until a next signal representing the turning-off of the key switch of the vehicle A is supplied. By this device, it is indicated that the engine of the vehicle A is in operation.

Thereafter, when, as mentioned before, the signal including frequency components $f_1$ and $f_2$ corresponding to an occurrence of abnormality at the sensor $a$ is received, the signal frequencies $f_1$ and $f_2$ are passed through the filters 180 and 181, and the Schmit circuit 188 and 189, respectively to terminals designated by $f_1$ and $f_2$ in FIG. 4. Upon these signals at the terminals $f_1$ and $f_2$, the NAND gate designated by $f_1 \cdot f_2$ provides an output which is supplied to one of the inputs of the NOR gate. Therefore, the latter provides an output which is supplied to one of inputs of the OR gate which in turn provides an output at a terminal $t_1$.

The output at the terminal $t_1$ is amplified and supplied to the alarm device 201. The alarm device 201 may be of any type and, as an example, it may be an audible signal generator. The audible signal generator provides an audible signal upon receipt of the output of the OR gate.

The output of the NAND gate $f_1 \cdot f_2$ is further provided at a terminal $T_4$. Though the line leading to the terminal $T_4$ is shown by a single solid line A, it should be noted that the line A containes a plurality, in this case eight, of lines and the terminal $T_A$ represents eight terminals.

The output of the NAND gate $f_1 \cdot f_2$ at the terminal $T_A$ is amplified by the amplifier 197 and supplied to the abnormality indication device 198. The latter device comprising a plurality of indicating devices such as lamps each corresponding to different one of the check points of the vehicles.

In this example, since the signal $f_1 \cdot f_2$ is assigned to the engine rotation sensor $a$, a lamp corresponding to the sensor $a$ is lightened upon the amplified output of the NAND gate $f_1 \cdot f_2$. The output is also supplied to the counter device 199 which also includes a corresponding number of counters to count the number of occurrences of the abnormal conditions at specific points. This data is also supplied to the recorder 200 for recordkeeping.

With the arangement described hereinbefore, the operation of the vehicles can be identified and any abnormality occuring at any check points thereof can also be identified.

Figure 6:
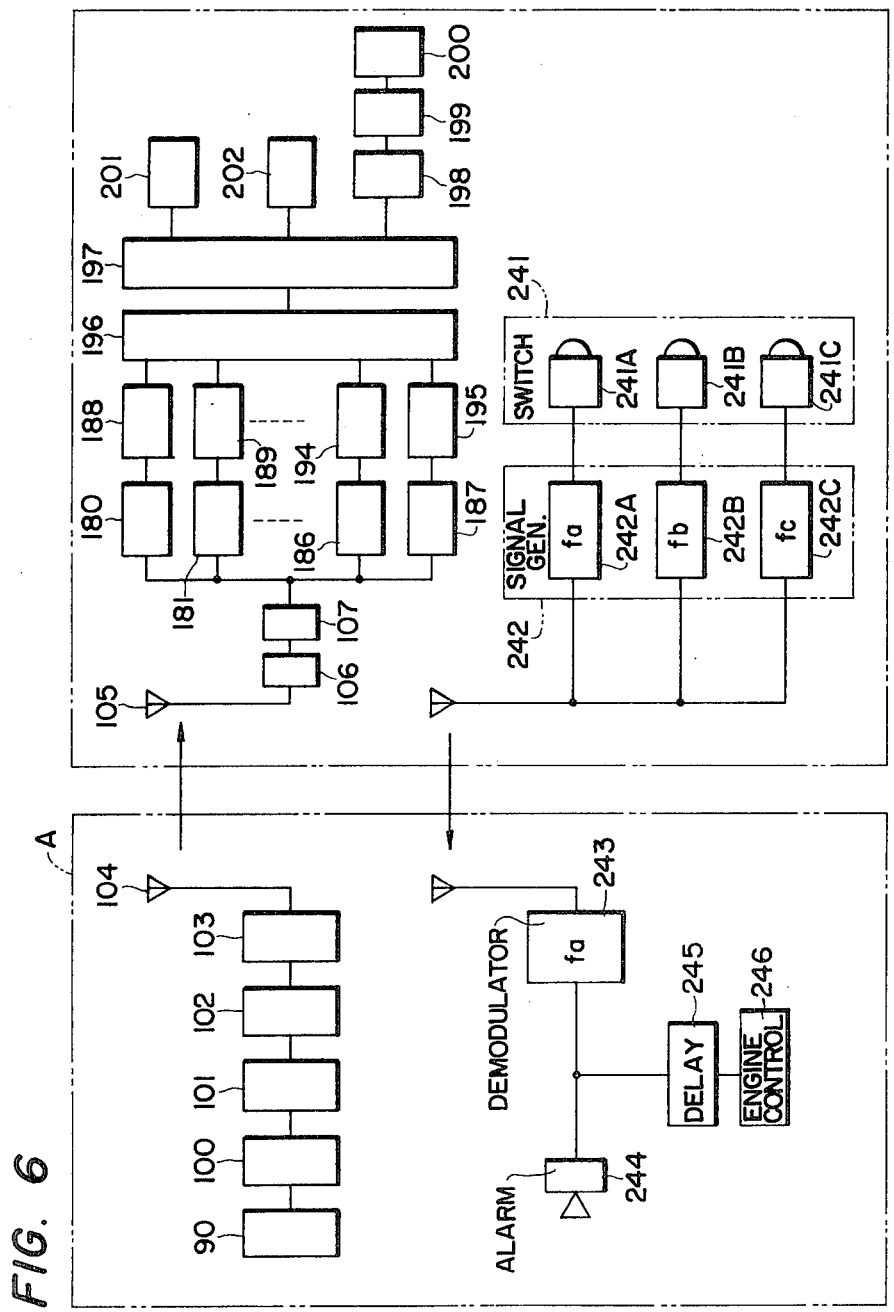
FIG. 6 is another embodiment of the monitor station.

FIG. 6 shows another embodiment of the present invention. The difference between the previous embodiment and the embodiment in FIG. 6 is that the latter includes a manually controllable alarm signal transmitter in the monitor station and an alarm signal receiving and vehicle controlling device in each of the vehicles.

The alarm signal transmitter provided in the monitor station comprises a manual switch 241 and an alarm signal generator 242. The function of the latter is to generate a suitable signal in response to an actuation of the manual switch 241 and to suitably modulate the signal to transmit.

The alarm signal receiver provided on each of the vehicles comprises a demodulator 243, a suitable alarm indicating device 244, such as an audible or visible indicator, a delay device 245 and an engine control mechanism 246.

The additional features of FIG. 6 have the purpose of notifying the operators of the vehicles the occurrences of abnormalities in their vehicles. As well known, even if the monitor station recognizes the abnormality, the operator of the vehicle does not always know the fact. This is very big problem if the abnormality is one which may make the vehicle inoperative.

When, the abnormality is recognized in the monitor station or when the number of the occurences of abnormality at a specific point exceeds a predetermined number, the manual switch 241 is depressed to actuate the alarm signal generator 242. The alarm signal may be transmitted in modulated form. The manual switch 241 includes switches 241A, 241B and 241C in this instance and the signal generator 242 includes a generator 242A which generates a signal $f_a$, a generator 242B which generates a signal $f_b$ and a generator 242C which generates a signal $f_c$, which are connected to the switches 241a, 241b and 241c, respectively. The signals $f_a$, $f_b$ and $f_c$ are assigned to the vehicles A, B and C, respectively.

It is assumed that one of the sensors on the vehicle A detects an abnormality and this fact is informed to the monitor station. At that time, the observer in the monitor station depresses the manual switch 241a. Upon the depression of the switch 241a, the corresponding signal generator 242a produces the signal $f_a$ and transmits it in modulated form. In order to minimize the number of channels, it may be advisable to employ frequency modulation as in the abnormality detecting system.

The frequency modulated signal $f_a$ is received by the signal receiver on the vehicle A tuned to the frequency $f_a$ and demodulated by the demodulater 243. The demodulated signal is directly used to actuate the alarming device 244 to notify the operator of that vehicle that an abnormality has occured. According to this alarm, the operator will take necessary steps to restore the normal operation of the vehicle.

The signal receiver further includes the delay 245 connected to the output of the demodulater 243 and the engine control mechanism 246 connected to the delay 245, as mentioned before. The purpose of the arrangement of the delay 245 and the engine control mechanism 246 is to automatically decelerate or stop the operation of the vehicle when the operator does not take an appropriate action immediately upon the actuation of the alarm. That is, there is a case where the indication of the abnormal condition in the monitor station does not disappear for a certain time after the manual switch is depressed. This means that the operator of the vehicle did not take the required, immediate action to the vehicle.

The time constant of the delay device 245 is selected suitably so that it provides a suitable delay time. The delay time may be long enough to permit the operator to take the appropriate action. The output of the delay 245 is supplied to the mechanism 246 which may comprise, for example, an electromagnetic solenoid to reduce the fuel supply to the engine of the vehicle to thereby decelerate or stop the engine. One example of the mechanism is disclosed in Japanese patent application No. 98855/1974 and in U.S. patent application Ser. No. 608,261 (filed on Aug. 27, 1975) entitled as "Automatic Safety and Alarming Apparatus for Construction Equipments" and assigned to the same assignee as this application, both being pending.

While the present invention has been described with reference to the specific embodiments, it should be noted that various modifications can easily be made by those of ordinary skill in the art without departing from the spirit of the present invention. For example, the logical arrangements of the logic circuit 196 may be modified easily. Further, the two-frequency mixing technique may be expanded to any combination of any number of frequencies.

What is claimed is:

1. A monitor system for monitoring a plurality of construction vehicles, each having an engine key switch and a plurality of checkpoints, said monitoring system comprising at each said plurality of construction vehicles, a plurality of sensor means for sensing said plurality of checkpoints, respectively, and for providing an indication of abnormality at said plurality of checkpoints, respectively, audio signal oscillator means producing a set of frequencies differing from one another, said set being common to all said vehicles, mixing means for combining said frequencies in suitable combination to produce a plurality of mixed-multi-frequency signals, each of said mixed-multi-frequency signals consisting of a unique combination of said frequencies, said combination being unique both to the vehicle where generated and to all said vehicles in said monitoring system, selecting means connected to said mixing means and said sensor means for outputing respective ones of said mixed-multi-frequency signals responsive to indications of abnormality, each said sensor means produced indication of abnormality resulting in the output of a particular multi-frequency signal uniquely identifying said sensor means, a frequency modulation means for frequency modulating said outputed mixed-multi-frequency signals provided by said selecting means, and an output circuit means for transmitting the frequency modulated signal, said monitoring system further comprising a monitor station responsive to said transmitted frequency modulated signals from all said vehicles for identifying the abnormal condition and the vehicle on which the abnormal condition occurs.

2. A monitor system as claimed in claim 1 wherein said monitor station comprises, means for demodulating and regulating said transmitted frequency modulated signal from any of said construction vehicles, a plurality of filters corresponding in number and passband to said set of frequencies, said plurality being connected to the output of said demodulating and regulating means, whereby the frequencies composing the mixed-multi-frequency signals which modulated the transmitted frequency result in output frequency detection signals at the outputs of the corresponding filters, a plurality of Schmitt trigger circuits connected, respectively, to said plurality of filters for digitizing said output frequency detection signals, and identifying sensor means connected to said Schmitt trigger circuits and responsive to said output frequency signals for identifying the particular abnormal condition occurring and the vehicle where the abnormal condition occurs.

* * * * *